July 12, 1949.  A. H. PEARSON  2,475,755
VEHICLE COOLING APPARATUS USING CARBON DIOXIDE
Filed Nov. 18, 1946
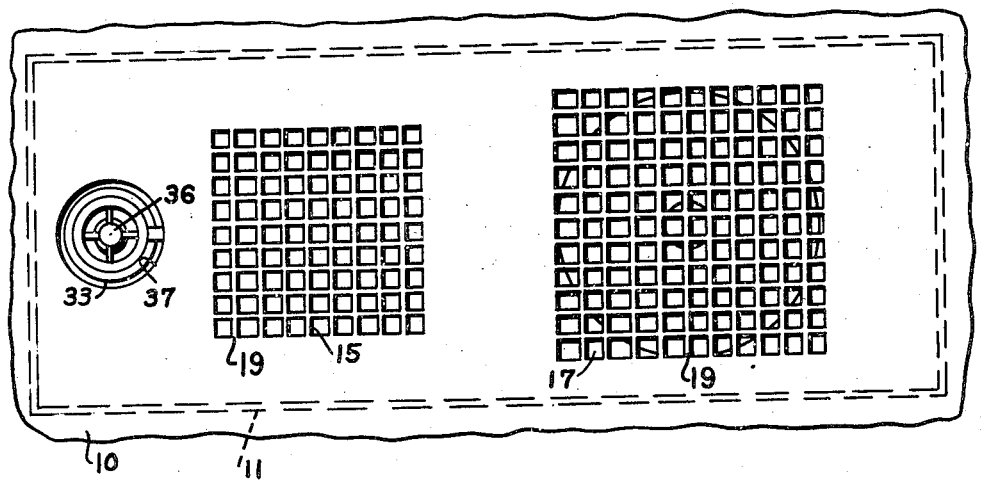
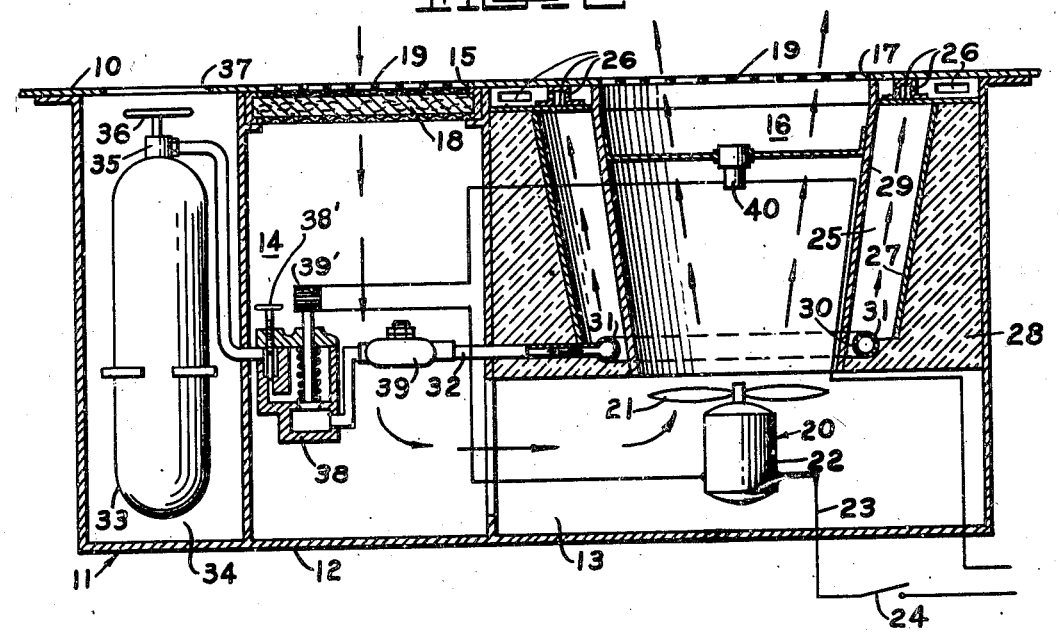
INVENTOR.
Alan H. Pearson
BY
Whittemore Hulbert & Belknap
ATTORNEYS Patented July 12, 1949

2,475,755

UNITED STATES PATENT OFFICE 2,475,755

VEHICLE COOLING APPARATUS USING CARBON DIOXIDE

Alan H. Pearson, Detroit, Mich., assignor to Pearson, Inc., Detroit, Mich., a corporation of Michigan Application November 18, 1946, Serial No. 710,571

3 Claims. (Cl. 62—92)

This invention relates generally to air conditioning equipment and refers more particularly to improvements in apparatus for cooling the interior of vehicle bodies.

One of the objects of this invention is to provide an air conditioning apparatus composed of a relatively few simple parts capable of being readily assembled to form a compact unit suitable for installation on relatively small vehicles for cooling the air within the body of the vehicle.

Another object of this invention is to provide air conditioning apparatus having a cooling chamber arranged in heat conducting relation to an air passage through which air is discharged into the interior of the vehicle body and having a storage tank for a gaseous refrigerant communicating with the chamber through a valve. The arrangement is such that gaseous refrigerant admitted to the chamber expands or solidifies to form ice, which absorbs heat from the air flowing through the passage into the vehicle body.

Still another object of this invention is to provide air conditioning apparatus having a blower positioned to draw air from the interior of the vehicle body and to discharge this air back into the body through the air passage referred to in the preceding paragraph. Thus the air within the vehicle body is continuously circulated through the air conditioning apparatus by the blower.

A further object of this invention is to provide temperature responsive means in the air stream for controlling the operation of the blower and valve. As a result, the air in the body may be substantially maintained at a predetermined temperature.

A still further feature of this invention is to provide air conditioning apparatus of the above general type wherein the quantity of refrigerating gas supplied to the refrigerant chamber for a given period of time is predetermined to avoid over- or under-charging the chamber when the thermostat operates to open the valve.

The foregoing as well as other objects will be made more apparent as this description proceeds, especially when considered in connection with the accompanying drawing, wherein:

Figure 1 is a fragmentary plan view of a part of a vehicle body; and

Figure 2 is a sectional view showing air conditioning apparatus constructed in accordance with this invention.

Referring now more in detail to the drawing, it will be noted that the reference numeral 10 indicates a portion of the flooring of a suitable vehicle body and the numeral 11 designates an air conditioning unit embodying the features of this invention.

The air conditioning unit comprises a casing 12 formed of any suitable material such, for example, as sheet metal and secured at its upper end to the underside of the flooring 10.

Upon reference to Figure 2 of the drawing, it will be noted that the casing 12 is constructed to provide an air passage 13 having one end portion 14 communicating with the interior of the vehicle body through an opening 15 in the flooring and having the other end portion 16 also communicating with the interior of the vehicle body through an opening 17 spaced from the opening 15. As will be more fully hereinafter described, the opening 15 serves as an inlet opening through which air from within the vehicle body is admitted to the passage 13, and a filter 18 is suitably supported in the upper end 14 of the passage 13 for cleaning the air passing through the opening 15. The opening 17 serves as an outlet opening for discharging the air withdrawn from the vehicle body through the opening 15 back into the body. If desired both openings 15 and 17 in the vehicle body flooring may be protected by a suitable grating 19.

A blower 20 is supported in the passage 13 directly below the end portion 16 of the passage for drawing air into the end portion 14 of the passage through the opening 15 in the vehicle body flooring 10 and for discharging this air back into the vehicle body through the end portion 16 of the passage 13. The blower 20 comprises a fan 21 and an electric motor 22 for operating the fan. In the present instance, the electric motor is connected in series with an electric supply circuit 23 and the latter is controlled by a switch 24 conveniently located within the vehicle body for manipulation by the operator.

Supported within the casing 12 in concentric relation to the end portion 16 of the air passage 13 is a chamber 25 having the upper end communicating with the atmosphere through vent openings 26 and having an outer wall 27 protected by a suitable insulating material 28. The inner wall 29 of the chamber 25 is formed of a material having high thermal conductivity and also serves as the wall of the end portion 16 of the passage 13. Thus air passing upwardly through the end portion 16 of the passage 13 into the vehicle body flows in heat conducting relationship to the wall 29 of the chamber 25.

Suitably supported in the chamber 25 at the lower end of the latter is an annular manifold 30 having a muliplicity of discharge ports 31 communicating with the interior of the chamber 25. The manifold 30 also communicates with a source of gaseous refrigerant through a conduit 32. In the present instance the source of gaseous refrigerant comprises an interchangeable tank or bottle 33 suitably supported in a compartment 34 of the casing 12 and having a valve 35 at the upper end. The valve 35 is adapted to be manually operated by a control element 36 and establishes communication between the tank 33 and the conduit 32. The control 36 is accessible from the interior of the vehicle body through an opening 37 formed in the flooring 10 in registration with the upper end of the compartment 34. The tank 33 or bottle contains a gaseous refrigerant under pressure, and this refrigerant is preferably of the type which solidifies when allowed to expand. For the purpose of illustrating this invention, it will be assumed that the tank 33 contains a supply of carbon dioxide gas.

Connected in the conduit 32 between the tank 33 and the manifold 30 is a valve 38. This valve is operated by a solenoid 39' having a coil connected in series with the electric circuit 23, so as to be energized to open the valve upon closing the switch 24 to initiate the operation of the blower 20. Also a pressure regulating valve 39 is preferably connected in the conduit 32 between the metering valve 38 and the manifold 30.

In the present instance the valve 38 is provided with a metering pin 38' capable of being adjusted to supply a predetermined quantity of gas to the annular chamber 25 in a given period of time. Through experimentation under actual operating conditions, it is possible to determine exactly the quantity of gas required to produce the amount of refrigerant necessary in the annular chamber 25 to accomplish the cooling effect.

It has previously been stated that the circuit 23 is controlled by the manually operable switch 24. In accordance with this invention, provision is also made for automatically controlling the circuit 23 when the latter is closed by the switch 24. For accomplishing this result, a thermostatically operated switch 40 is connected in series with the circuit 23 and is positioned in the end portion 16 of the passage 13. Thus the thermostatically operated switch 40 is located in the air stream, and is responsive to the temperature of the air to open or close the circuit 23. In other words, the thermostatically operated switch 40 controls the operation of both the blower 20 and the metering valve 38.

From the foregoing construction it will be noted that when both the manually operable switch 24 and thermostatically operated switch 40 are closed, the valve 38 is opened and the blower 20 is operated. Thus opening of the valve 35 allows gaseous refrigerant from the tank 33 to pass through the conduit 32 into the manifold 30. The gaseous refrigerant in the manifold 30 is discharged into the chamber 25 through the ports 31 and solidifies in the chamber to form carbon dioxide ice. This ice substantially lowers the temperature of the wall 29 and cools the air passing upwardly into the vehicle body through the portion 16 of the passage 13. This air also passes in heat conducting relationship to the thermostatically operated switch 40, so that when the temperature of the air is lowered to the specified degree, the switch is automatically opened to break the circuit 23. As a result the coil of the solenoid 39' is deenergized, and the valve 38 is closed to prevent further flow of refrigerant to the chamber 25. Also the operation of the blower 20 is discontinued, and circulation of air through the passage 13 is substantially diminished. However, when the temperature of the air increases above a preselected temperature, the switch 40 is again closed to establish the circuit 23. As soon as the circuit 23 is closed, the solenoid 39' opens the valve 38 and starts the blower 20.

Thus, from the foregoing it will be apparent that I have provided a compact air conditioning apparatus capable of being readily installed on vehicles of practically any size without appreciable modification of the vehicle. It will further be noted that although the apparatus is composed of a relatively few simple parts, nevertheless, it operates effectively to cool the air within the vehicle body with little or no attention on the part of the user. Actually the only service required is to interchange the tank or bottle 33 to replenish the refrigerant, and this may be readily accomplished through the opening 37 in the vehicle body flooring.

What I claim as my invention is:

1. Air conditioning apparatus comprising a casing having inlet and outlet openings for air, means within the casing forming a passage between said openings, a chamber for refrigerant located within the casing in heat conducting relationship to the walls of the passage adjacent the outlet opening and vented to the atmosphere, a source of refrigerant supported within the casing and having a fluid connection with the chamber, a valve in said fluid connection for regulating the flow of refrigerant to the chamber, means housed within the casing for circulating air through the passage, and means controlled by the temperature of the air flowing through the passage for operating said valve.

2. Air conditioning apparatus comprising a casing having spaced inlet and outlet openings for air, means within the casing forming a passage between the openings, a chamber for refrigerant surrounding the passage adjacent the outlet opening and vented to the atmosphere, a source of refrigerant supported within the casing and having a fluid connection with the chamber, a valve in the fluid connection for regulating the flow of refrigerant to the chamber, a blower supported in the passage between the outlet openings for circulating air through the passage, and means controlled by the temperature of the air flowing through the outlet opening for operating said valve.

3. Air conditioning apparatus comprising a casing having spaced inlet and outlet openings for air, means within the casing forming a passage between said openings, a chamber for refrigerant positioned in heat conducting relationship to the walls of the passage adjacent the outlet opening and vented to the atmosphere, a source of refrigerant supported within the casing and having a fluid connection with the chamber, a blower supported within the casing for circulating air through the passage, a valve in the fluid connection for regulating the flow of refrigerant to the chamber, and temperature responsive means located in the passage for operating both said valve and blower.

ALAN H. PEARSON.

REFERENCES CITED

The following references are of record in the file of this patent:

UNITED STATES PATENTS

| Number | Name | Date |
| --- | --- | --- |
| 1,932,533 | Post et al. | Oct. 31, 1933 |
| 2,089,428 | Ross et al. | Aug. 10, 1937 |
| 2,120,299 | Stramaglia | June 14, 1938 |
| 2,162,538 | Peo | June 13, 1939 |
| 2,318,222 | Heisler | May 4, 1943 |